United States Patent
Standke

(10) Patent No.: US 8,101,682 B2
(45) Date of Patent: Jan. 24, 2012

(54) LIQUID VISCOUS PRODUCT BASED ON AN ORGANOFUNCTIONAL SILANE SYSTEM FOR PRODUCING WEATHERING-STABILE PROTECTIVE COATINGS FOR PREVENTING SURFACE SOILING

(75) Inventor: Burkhard Standke, Loerrach (DE)

(73) Assignee: Evonik Degussa GmbH, Essen (DE)

( * ) Notice: Subject to any disclaimer, the term of this patent is extended or adjusted under 35 U.S.C. 154(b) by 174 days.

(21) Appl. No.: 11/718,442

(22) PCT Filed: Sep. 7, 2005

(86) PCT No.: PCT/EP2005/054422
§ 371 (c)(1),
(2), (4) Date: May 2, 2007

(87) PCT Pub. No.: WO2006/048348
PCT Pub. Date: May 11, 2006

(65) Prior Publication Data
US 2009/0069464 A1 Mar. 12, 2009

(30) Foreign Application Priority Data
Nov. 2, 2004 (DE) .................. 10 2004 053 384

(51) Int. Cl.
C08L 83/00 (2006.01)
C08L 83/04 (2006.01)
C08K 9/04 (2006.01)
C08K 9/06 (2006.01)
C08G 77/04 (2006.01)

(52) U.S. Cl. .......... 524/588; 524/35; 524/394; 524/83; 524/99; 427/429; 427/428.01; 427/255.6

(58) Field of Classification Search .......... 524/35, 524/588, 428, 394, 83, 99; 427/429, 428.01, 427/255.6
See application file for complete search history.

(56) References Cited

U.S. PATENT DOCUMENTS

| | | | |
|---|---|---|---|
| 4,226,793 A | 10/1980 | Kotzsch et al. | |
| 5,591,818 A | 1/1997 | Standke et al. | |
| 5,629,400 A | 5/1997 | Standke et al. | |
| 5,679,147 A | 10/1997 | Standke et al. | |
| 5,808,125 A | 9/1998 | Standke et al. | |
| 5,849,942 A | 12/1998 | Standke et al. | |
| 5,863,509 A | 1/1999 | Standke et al. | |
| 5,885,341 A | 3/1999 | Standke et al. | |
| 5,932,757 A | 8/1999 | Standke et al. | |
| 6,054,601 A | 4/2000 | Standke et al. | |
| 6,118,015 A | 9/2000 | Haas et al. | |
| 6,133,466 A | 10/2000 | Edelmann et al. | |
| 6,139,622 A | 10/2000 | Gobel et al. | |
| 6,176,918 B1 | 1/2001 | Glausch et al. | |
| 6,177,582 B1 | 1/2001 | Jenkner et al. | |
| 6,228,936 B1 | 5/2001 | Standke et al. | |
| 6,239,194 B1 | 5/2001 | Standke et al. | |
| 6,251,989 B1 * | 6/2001 | Edelmann | 524/837 |
| 6,255,513 B1 | 7/2001 | Standke et al. | |
| 6,288,256 B1 * | 9/2001 | Standke | 556/425 |
| 6,361,871 B1 | 3/2002 | Jenkner et al. | |
| 6,387,166 B1 * | 5/2002 | Abele et al. | 106/3 |
| 6,395,858 B1 | 5/2002 | Mack et al. | |
| 6,403,228 B1 | 6/2002 | Mack et al. | |
| 6,491,838 B1 * | 12/2002 | Standke et al. | 252/8.57 |
| 6,534,667 B1 | 3/2003 | Standke et al. | |
| 6,641,870 B2 * | 11/2003 | Bartkowiak et al. | 427/407.1 |
| 6,685,766 B2 | 2/2004 | Standke et al. | |
| 6,713,186 B1 | 3/2004 | Jenkner et al. | |
| 6,767,982 B2 | 7/2004 | Standke et al. | |
| 6,770,327 B2 | 8/2004 | Edelmann et al. | |
| 6,841,197 B2 | 1/2005 | Standke et al. | |
| 7,427,442 B2 | 9/2008 | Albert et al. | |
| 7,578,877 B2 | 8/2009 | Giessler et al. | |
| 7,666,257 B2 | 2/2010 | Giessler-Blank et al. | |
| 7,670,422 B2 | 3/2010 | Giessler-Blank et al. | |
| 2002/0017223 A1 * | 2/2002 | Summerfield | 106/620 |
| 2002/0127415 A1 * | 9/2002 | Standke et al. | 428/447 |
| 2003/0203117 A1 | 10/2003 | Bartkowiak et al. | |
| 2005/0038150 A1 * | 2/2005 | Meiners et al. | 524/263 |
| 2005/0100677 A1 * | 5/2005 | Su et al. | 427/420 |
| 2007/0054056 A1 | 3/2007 | Albert et al. | |
| 2008/0003448 A1 | 1/2008 | Standke et al. | |
| 2008/0206572 A1 | 8/2008 | Edelmann et al. | |
| 2008/0221318 A1 | 9/2008 | Edelmann et al. | |
| 2008/0233341 A1 | 9/2008 | Jenkner et al. | |
| 2009/0007818 A1 | 1/2009 | Militz et al. | |
| 2009/0022898 A1 | 1/2009 | Standke et al. | |
| 2009/0069464 A1 | 3/2009 | Standke | |

FOREIGN PATENT DOCUMENTS

| | | |
|---|---|---|
| EP | 0 846 717 | 6/1998 |
| EP | 0 960 021 | 12/1999 |
| EP | 1 101 787 | 5/2001 |
| EP | 1 386 951 | 2/2004 |
| FR | 2 684 682 | 6/1993 |

OTHER PUBLICATIONS

Technical Data Sheet for Cellosize QP 100MH hydroxyethylcellulose, Dow Chemical Company, Jul. 2004, p. 1.*
U.S. Appl. No. 11/569,363, filed Nov. 20, 2006, Standke et al.
U.S. Appl. No. 11/576,504, filed Apr. 2, 2007, Mueh et al.
U.S. Appl. No. 11/815,391, filed Aug. 2, 2007, Standke et al.
U.S. Appl. No. 11/814,127, filed Jul. 17, 2007, Standke et al.
U.S. Appl. No. 10/581,690, filed Jun. 6, 2006, Standke.
U.S. Appl. No. 11/572,555, filed Jan. 23, 2007, Just et al.
U.S. Appl. No. 11/572,691, filed Jan. 25, 2007, Edelmann et al.
U.S. Appl. No. 12/161,112, filed Jul. 16, 2008, Standke et al.
U.S. Appl. No. 12/596,725, filed Oct. 20, 2009, Giessler-Blank et al.

(Continued)

Primary Examiner — James J Seidleck
Assistant Examiner — Deve E Valdez
(74) Attorney, Agent, or Firm — Oblon, Spivak, McClelland, Maier & Neustadt, L.L.P.

(57) ABSTRACT

The present invention relates to a composition comprising an organofunctional silane system, in which fluorinated alkyl groups of the general formula $F_3C(CF_2)_r(CH_2)_s-$ (Ib) are attached to some of the silicon atoms, and a thickener, to a process for preparing such a composition, and to the use of the composition for preventing surface soiling.

18 Claims, No Drawings

OTHER PUBLICATIONS

U.S. Appl. No. 12/673,390, filed Feb. 16, 2010, Wassmer et al.
U.S. Appl. No. 11/572,688, filed Jan. 25, 2007, Edelmann et al.
U.S. Appl. No. 12/674,271, filed Feb. 19, 2010, Albert et al.
U.S. Appl. No. 12/678,299, filed Mar. 16, 2010, Borup et al.

* cited by examiner

LIQUID VISCOUS PRODUCT BASED ON AN ORGANOFUNCTIONAL SILANE SYSTEM FOR PRODUCING WEATHERING-STABILE PROTECTIVE COATINGS FOR PREVENTING SURFACE SOILING

CROSS REFERENCE TO RELATED APPLICATION

This application is a 371 of PCT/EP05/054422, filed on Sep. 7, 2005, and claims priority to German Patent Application No. 10 2004 053 384.9, filed on Nov. 2, 2004.

The present invention relates to a composition comprising an organofunctional silane system, in which fluorinated alkyl groups of the general formula $F_3C(CF_2)_r(CH_2)_s$— (Ib) are attached to some of the silicon atoms, and a thickener, to a process for preparing such a composition, and to the use of the composition for preventing surface soiling.

The impregnation of porous mineral building materials for the purpose of surface oil and water repellency has been practiced for a long time. More recently there have also been impregnations which act to repel dirt, ink, and paint. This effect is commonly referred to as "antigraffiti" effect. The impregnation is what is referred to as antigraffiti impregnation. One example of such antigraffiti impregnation are products as specified in Example 1 of EP-A 1 101 787. For water-, and oil-repellent impregnation of mineral substrates, fluorinated resin systems are used, such as various products from DuPont, examples being Zonyl 9361, 225, 210, 9027, 8740, 321 and 329, or similar products from other manufacturers, such as Wacker BS 28 or Wacker BS 29, for example.

Permanent antigraffiti impregnation of the kind described, for example, in EP-A 1 193 302 is applied to the substrate by a multiple coating process. This operation is labor-intensive and is best realized by way of special spraying methods, as described in EP-A 1 358 946. Applications by spraying are often disadvantageous in practice, particularly when work takes place in areas in which spray mists lead to problems (for example, automobiles parked in the vicinity of the application site). Costly and inconvenient protective measures must be taken in such cases. Application by brush or roller is preferred, since it does not give rise to spray mists which can generate unwanted contamination. Another disadvantage of the permanent antigraffiti coatings of EP-A 1 193 302 are the costs of the active ingredient solution, due to the high concentration of the expensive, active silane ingredient system. Oftentimes permanent protection (i.e., the applied protective coat withstands more than 15 cleaning cycles) is not necessary. In such cases products from the kind known from EP-A 1 193 302 are too expensive, and recourse is had to commercially customary, temporary systems, mostly based on wax or on polysaccharide. An inherent drawback of such systems, however, is the need to re-apply them after each cleaning operation. Moreover, the weathering stability of these systems is low, and so in many cases renewed application is necessary at three-month intervals in order to maintain the effectiveness of the system, even when there has been no graffiti cleaning. This necessitates a high maintenance effort and hence a high cost outlay.

The object is therefore to develop a cost-effective, weathering-stable protective system which can be applied by brush or roller and which withstands one or more cleaning operations.

This object is achieved by means of a composition which comprises
(a) an organofunctional silane system,
in which fluorinated alkyl groups of the general formula $F_3C(CF_2)_r(CH_2)_s$— are attached at least to some of the Si atoms, r being an integer between 1 and 18 and s being 0 or 2, and also
(b) a thickener, and
(c) water or another suitable diluent.

Surprisingly it has been found that the desired profile of properties outlined above can be achieved by combining an organofunctional silane system (a) in which fluorinated alkyl groups of the general formula $F_3C(CF_2)_r(CH_2)_s$— are attached to some of the Si atoms, r being an integer between 1 and 18 and s being 0 or 2, with a thickener (b) and water or with another solvent or diluent (c). As a result of the combination with the thickener (b) it is possible to use the actual active ingredient, i.e., the silane system (a), in a significantly diluted form without any loss of activity. Through the use of the thickener (b) the viscosity of the composition for application is brought to the desired viscosity of preferably >20 mPa s. This viscosity ensures that the composition on the one hand is liquid but on the other hand does not run off uselessly when applied to the material that is to be protected, and hence that the silane system (a) is able to develop its effect in the manner desired. In formulations of this kind, surprisingly, very good antigraffiti properties are achieved even when the concentration of the active fluorinated silane component is less than 5% by weight. It has been found, again surprisingly, that the product can be applied by rolling or brushing. Application by means of spraying methods (airless, HVLP) is also possible.

The composition may, if desired, include further components, such as preservatives, flow control assistants, and additional non-Si-containing fluorine components, for example.

The rheological properties of the formulation allow it to be applied simply and without defects. The desired consumption of the protective product can be controlled, in a way which is tailored to the substrate requiring protection, by means of multiple application.

Products which have shown themselves to be very suitable as the fluorosilane system (a) are products as described in EP-A1 101 787, EP-A 0 960 921, EP-A 0856 717, and EP-A 0 846 716.

These are organosiloxanes containing at least one triamino group of the formula (Ia)

$[NH_x(CH_2)_aNH_y(CH_2)_bNH_z]$— (Ia), the triamino group being attached to at least one silicon atom via at least one further N—attached alkylene group having 1 to 4 carbon atoms, a and b being identical or different and being an integer from 1 to 6, x being 0 or 1 or 2, y being 0 or 1, z being 0 or 1 or 2, with the proviso that $(x+y+z) \leq 4$,
and at least one Si—C— attached fluoroalkyl group of the formula (Ib)

$F_3C(CF_2)_r(CH_2)_s$— (Ib), in which r is an integer from 0 to 18 and s is 0 or 2. These organosiloxanes are described in detail in EP-A1 101 787.

Organosiloxanes of this kind are based generally on what are called [M], [D], and [T] structural units, as are familiar to the skilled worker, it also being possible for the oligomeric and polymeric organosiloxane units to form aggregates.

Also suitable are fluoroalkyl-functional organopolysiloxanes having the general formula (I)

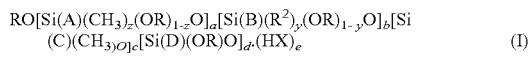

in which A is an aminoalkyl radical derived from the general formula (II)

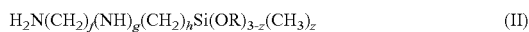

where $0 \leq f \leq 6$, $g=0$ if $f=0$ and $g=1$ if $f>0$, $0 \leq h \leq 6$, and $0 \leq z \leq 1$,
and B is a fluoroalkyl radical derived from the general formula (III)

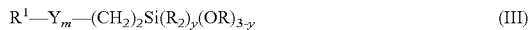

$R^1$ being a mono-, oligo- or perfluorinated alkyl group having 1 to 9 carbon atoms or a mono-, oligo- or perfluorinated aryl group, Y being a $CH_2$—, O— or S group, $R^2$ being a linear, branched or cyclic alkyl group having 1 to 8 carbon atoms or an aryl group, m being 0 or 1 and $0 \leq y \leq 1$, and
C is an alkyl radical derived from the general formula (IV)

and D is likewise an alkyl radical, but derived from the general formula (V)

$R^3$ in the above formulae being a linear, branched or cyclic alkyl group having 1 to 8 carbon atoms, $R^3$ in the above formulae being identical or different at each occurrence, R in the above formulae being a linear, branched or cyclic alkyl group having 1 to 8 carbon atoms or an aryl group, and R in the above formulae being identical or different at each occurrence, and HX being an acid, X being an organic or inorganic acid radical, and $0 \leq y \leq 1$, $0 \leq z \leq 1$, $a>0$, $b>0$, $c \geq 0$, $d \geq 0$, $e \geq 0$ and $(a+b+c+d) \geq 2$. These organopolysiloxanes are described in detail in EP-A 0 846 716 and EP-A 0 846 717.

Additionally suitable is an oligomerized organopolysiloxane cocondensate obtainable by mixing an organosilane having the formula (II), in which f is 0 or an integer from 1 to 6, g is 0 if f is 0 and g is 1 if f is other than 0, h is an integer from 1 to 6, z is 0,1 or 2, and the remaining radicals are as defined above, with a fluoro-functional organosilane having the formula (III), in which y is 0 or 1, and/or with at least one organosilane of the formula (IV) and/or one organosilane of the formula (V), in a molar ratio $M=[a/(b+c+d)] \geq 0.1$, a being the sum of the numbers of moles of organosilanes of formula (II), b, if appropriate, being the sum of the numbers of moles of organosilanes of formula (III), c, if appropriate, being the sum of the numbers of moles of organosilanes of formula (IV), and d, if appropriate, being the sum of the numbers of moles of organosilanes of the formula (V); adding water or an acid, and an alcohol if desired, to the mixture; and carrying out oligomerization. This organopolysiloxane cocondensate is described in detail in EP-A 0 960 921.

Besides the functional groups of the invention, suitable organosiloxanes normally carry hydroxyl groups and/or alkoxy groups as further functionalities. The presence of hydroxyl and/or alkoxy groups can generally be controlled by way of the amount of water supplied during preparation and the completeness of the removal of alcohol. Furthermore, the organosiloxanes of the invention can also contain, i.e., carry, as additional functionalities, alkyl groups having 1 to 16 carbon atoms.

Thickeners (b) which can be used include all known thickeners, although preference is given to using cellulose derivatives, more preferably hydroxyethylcelluloses having a viscosity of the aqueous solution in the concentration range from 1 to 5%, based on the cellulose employed, of from 50 to 100 000 mPa s. Cellosize grades from Dow Chemical are outstandingly suitable. Particular suitability in this context is possessed by Cellosize WP-09 H and also Cellosize QP 100 MH. These products exhibit a viscosity of 113 to 150 mPa s (5% strength solution of Cellosize WP-09 H) or 4400 to 6000 mPa s (1% strength solution of Cellosize QP 100 MH). Information on these Cellosize grades, and also on the other suitable hydroxyethylcelluloses, is available directly via www.dow.com/cello/prod/index.htm.

A suitable diluent (c), first and foremost, is water, which is preferred; however, any other diluent is also suitable in which first the silane system (a) and secondly the thickener (b) are soluble, suspendable, emulsifiable, and dilutable without the desired properties of the composition being lost. Examples of such other diluents are, in particular, organic solvents of low molecular mass, such as alcohols, for example. Combinations of water and another diluent can also be employed.

Further fluorine components that can be used include fluoroacrylic methacrylates, fluoroalkyl esters, fluoroalkyl phosphates, fluorinated isocyanates, fluoroalkyl carboxylates and/or fluoroalkyl sulfates, or organic polymers, preferably polyacrylates, which have been equipped with the abovementioned functionalities and which may, furthermore, contain quaternary ammonium groups. Particularly suitable components are the commercially available products Zonyl 8857, 8867, 8952, 8740 and 9027 (water-soluble, fluoroalkyl-modified acrylate polymer solutions), Zonyl 321 and/or Zonyl 329 (cationic fluorine-acrylic copolymers, containing about 25% active substance, about 28% solvents, N-methylpyrrolidone and acetic acid, and about 47% water) from DuPont.

Preservatives which can be used are commercially customary products, based for example on isothiazolinones, methylisothiazolinone, chloromethylisothiazolinone, octylisothiazolinone, tetramethylolacetylenediurea, ethylene glycol hemiformal, dimethylolurea, bromonitropropanediol, carbendazim, terbutryn, zinc pyridinethione, sodium pyridinethione and/or dodecyldimethylammonium chloride.

Suitable flow control assistants include solvents and surfactants that are compatible with the system as a whole—that is, do not give rise to phase separation, such as instances of precipitation, for example. Particular suitability is possessed by glycol-based products, such as butyl diglycol, for example.

The fluorinated silane system (a) is used preferably in an active ingredient concentration of from 0.5% to 15% (calculated as solids content), the thickener is used in a concentration of from 0.1% to 10%, the additional fluorine component is used in a concentration of from 0 to 30%, the preservative is used in a concentration of from 0 to 1%, and the flow control assistant is used in a concentration of from 0 to 10%. The solvent and/or water makes up the overall formulation to 100%.

The overall formulation can be prepared by mixing the individual components. In this context it has proven appropriate first to dissolve the thickener (b) in the solvent/diluent (c) and to add the remaining components with stirring. This gives a liquid, viscous, transparent protective coating having a viscosity >20 mPa s. The protective coating is much more stable to weathering than alternative, commercially customary systems based on waxes and polysaccharides.

The soiled, protected substrate is best cleaned using special, paint-dissolving cleaners, based preferably on N-methylpyrrolidone, orange terpenes and/or dibasic esters, such as dimethyl esters of succinic, glutaric, and adipic acid, for example (available commercially, for example, under the name DBE from DuPont). The removal of soiling which has been applied to the protected substrate, such as paints, can be carried out a number of times without having to reapply the protective system described here.

EXAMPLES

Concrete stone mineral substrates used in the examples below, in accordance with DIN EN 1344, are "plaster bricks" for the antigraffiti test and Maintal sandstone for the accelerated weathering test.

The antigraffiti properties are assessed by means of a functional test and stress test.

The test methods specified in the examples are customary for architectural preservation and are elucidated in more detail below:

(1) Determination of Reduction in Water Absorption

The specification describes the testing of the water repellency quality on mineral building materials. By underwater storage of a hydrophobicized specimen, the water absorption and, by comparison with the water absorption with a reference sample (untreated sample), the reduction in water absorption, of the hydrophobicized sample are determined.

The water absorption is determined by storing the treated and untreated specimens in deionized water (underwater storage). For this purpose, treated and untreated samples enter separately into troughs filled with deionized water. The water level should be about 1 cm above the specimens.

After 24 hours of underwater storage the weight increase is determined by weighing to an accuracy of 0.1 g. Prior to each weighing, superficially adhering water is dabbed off with cellulose.

The test report shall include the following information concerning both the hydrophobicized specimen and the reference sample:
1. Weight prior to water storage, in g
2. Weight after 24 hours' water storage, in g
3. Weight difference in g
4. Water absorption in abs. %, based on the initial weight of the specimen
5. Water absorption in rel. %, based on the untreated samples
6. Reduction in water absorption, in %.

(2) Determination of Depth of Penetration

The method is used for determining the depth of penetration of impregnating media into mineral building materials.

The depth of penetration is determined by breaking the treated specimens into two parts and wetting each of the fracture faces with an aqueous paint system. The unimpregnated zone becomes colored, whereas the impregnated zone remains colorless. Measurements of the breadth from the treated surface to the color bordering area are made at eight different points on the specimen. These measurements are used to calculate an average depth of penetration (in mm).

(3) The antigraffiti functional test is described in detail in Regelwerk für die Bewertung von Verfahren, Technologien und Materialien zur Graffitientfernung und Graffitiprophylaxe [Framework for the evaluation of methods, technologies, and materials for graffiti removal and graffiti prevention] [ReGG] of the Gütegemeinschaft Antigraffiti [Antigraffiti association], Copyright 2000 by Labor Dr. Kupfer, Alt Stralau 54, 10245 Berlin, Germany.

The test employed in the examples is oriented on the above test specification and is performed as follows:

The test paints (including inks) used are as follows:

| | | |
|---|---|---|
| 1. | Edding AG Ahrensburg | Edding 800 Permanent Marker, black |
| 2. | Dupli-Color | Acrylic paint RAL 3000 flame red |
| 3. | Hagebau (HIC*) | Alkyd spray paint, high gloss, fuchsia pink |
| 4. | Toom (HIC) | Genius Pro Aqua spray paint, high gloss, gentian blue |
| 5. | MZZE Hip Hop mail order | On The Run superfresh Color Marker blue |
| 6. | MZZE Hip Hop mail order | Molotow XXL Classic "Easter yellow" |
| 7. | MZZE Hip Hop mail order | Molotow XXL Classic "chrome" |
| 8. | MZZE Hip Hop mail order | Molotow XXL Devil Colors "pitch black" |
| 9. | MZZE Hip Hop mail order | Molotow XXL Classic "Ultramarine blue" |
| 10. | MZZE Hip Hop mail order | Covers All Bitumen, combination, black |

*HIC = home improvement center

Procedure:

The building materials, e.g., concrete, sandstone, clinker, etc., are treated with a graffiti preventative. One blank sample (building material without graffiti protection) per building material used must be employed, for comparison.

Following an appropriate setting time, the paints are applied for the functional test. The paints are left to dry at room temperature in the laboratory for 7 days.

The same cleaner (or cleaner system) within the test is used to clean the surface. This is done by applying the cleaner, leaving it to act for about 15 to 20 minutes and then removing it with a high-pressure cleaner (50 bar, unhealed). If residues of paint are still visible on the substrate surface, the blocks are left to dry for 2 to 3 hours (room temperature) and then the cleaning procedure is repeated once again.

Assessment of the result of testing:

The test result recorded is the visual assessment, supported by photographic documentation of the cleaning outcome.

The cleaning outcome is assessed visually as follows:

Removal 0 to 30% (no substantial paint removal): 1 point

Removal 30 to 75% (partial paint removal, colored outline clearly visible): 2 points Removal 75 to 90% (substantial paint removal, outlined shadows visible): 3 points Removal >90% (effective paint removal, outlined pale shadows visible): 4 points Complete removal of paint (individual paint pigments in pores are permitted): 5 points Test result, functional test:

Following the cleaning operation, the Ci value is determined by visual assessment of each individual color spot. The Ci value is calculated as follows:

$$Ci\text{ value} = (\text{Number of individual color spots} \times 20) / (\text{number of color spots}) \; Ci \text{ value max.} = 100$$

The accelerated weathering test is carried out using a QUV/spray accelerated weathering apparatus from Pausch Messtechnik GmbH. UVA-340 fluorescent lamps are the radiation source used. The surface properties before and after accelerated weathering are tested as follows: one drop of n-decane is applied to the surface of the block after treatment with the protection system. After an exposure time of 30 seconds an assessment is made as to whether the drop has penetrated the surface. If the liquid has penetrated the surface, a dark mark is produced. In that case there is a risk of paints, too, penetrating into the porous mineral substrate. Complete graffiti cleaning would then no longer be possible. If no dark mark is produced, the test is given a positive evaluation.

The liquid impregnating compositions of the invention are applied by brush. The amount applied is determined by immediate differential weighing of the substrate and is reported in $g/m^2$.

Example 1

Preparation of a Protectant Based on a Fluoro-Functional Organosilane and a Hydroxyethylcellulose (HEC) Combination

| Starting materials: | A silane system as described in EP-A 1 101 787; see above (fluorosilane system) |
| --- | --- |
| | Diethylene glycol monobutyl ether (DEGMBE) (flow control assistant) |
| | Cinon OL (preservative) is a product of Bode Chemie Hamburg (www.bode-chemie.de) and consists of an active ingredient combination of 2-octyl-3-(2H)-isothiazolinone and 3-iodo-2-propynyl butylcarbamate. |
| | Cellosize HEC QP 100 MH (thickener), hydroxyethylcellulose; see description above |
| | Cellosize WP-09H (thickener), hydroxyethylcellulose; see description above |
| | Deionized water |
| Batch size: | 1000 g |

Component 1 (Thickener)
(100 g of Cellosize WP-09H 10% strength in water)
10 g of Cellosize WP-09H were introduced with stirring into 90 g of deionized water and the mixture was stirred until a clear, pale yellowish solution was formed.

The batch was subsequently stirred at about 60° C. for 1 hour.

Component 2 (Thickener)
(50 g of Cellosize HEC QP 100 MH 1% strength in water)
0.5 g of Cellosize HEC-QP 100 MH were introduced with stirring into 49.5 g of deionized water and the mixture was stirred until a clear solution was formed.

The batch was subsequently stirred at about 60° C. for 1 hour.

Component 3
850 g of fluorosilane system were admixed with stirring with 1 g of butyl diglycol and 2 g of Cinon OL.

Blending
Components 1 and 2 were introduced and mixed with stirring with component 3. The end product was slightly turbid, pale yellow, and viscous.

Example 2

Preparation of a Protectant Based on Fluorosilane System, HEC, and Zonyl 329

| Starting materials: | Zonyl 329 (DuPont) |
| --- | --- |
| | Fluorosilane system (see above) |
| | Diethylene glycol monobutyl ether (DEGMBE) (see above) |
| | Cellosize HEC QP 100 MH (see above) |
| | Deionized water |
| Batch size: | 1000 g |

Component 1 (Thickener)
(500 g of Cellosize HEC QP 100 MH, 1% strength in water)
5 g of Cellosize HEC QP 100 MH were introduced with stirring into 495 g of deionized water and the mixture was stirred until a clear solution was formed.

Thereafter the batch was stirred at about 60° C. for 1 hour.

Component 2
100 g of Zonyl 329 and 50 g of fluorosilane system were introduced with stirring into 340 g of water and subsequently 10 g of DEGMBE were added.

Blending
Component 1 was admixed with stirring with component 2.

The end product was slightly turbid, pale yellow, and slightly viscous.

Example 3

Preparation of a Protectant Based on Fluorosilane System, HEC, and Zonyl 321

| Starting materials: | Zonyl 321 (DuPont) |
| --- | --- |
| | Fluorosilane system (see above) |
| | Cellosize WP-09 H (see above) |
| | Deionized water |
| Batch size: | 1000 g |

Component 1 (Thickener)
(200 g of Cellosize WP-09 H, 5% strength in water)
10 g of Cellosize WP-09 H were introduced with stirring into 190 g of deionized water and the mixture was stirred until a clear solution was formed.

Thereafter the batch was stirred at about 60° C. for 1 hour.

Component 2
100 g of Zonyl 321 and 50 g of fluorosilane system were introduced with stirring into 650 g of water.

Blending
Component 1 was admixed with stirring with component 2.

The end product was slightly turbid, pale yellow, and slightly viscous.

Example 4

Impregnation of concrete block with products from Examples 1, 2, and 3, and with Protectosil antigraffiti. Performance of antigraffiti test.

Commercial concrete blocks (concrete plaster blocks according to DIN EN 1344) were treated with products from Examples 1, 2, and 3. Application was performed by coating the respective products a number of times using a brush. Between the applications, the product was allowed to dry on the surface before the next application of product was made. The drying time between applications was approximately ½ an hour. In comparison to this, the fluorosilane system was applied to concrete blocks of the same kind by an HVLP spraying method. Spraying had to be carried out a number of times in order to achieve optimum antigraffiti performance. The drying time between spray applications was approximately ½ an hour. From the second spraying operation onward it was necessary for the droplets formed on the surface to be dispersed with a brush to give a homogeneous film of liquid.

| Product | Application method | Total product consumption |
|---|---|---|
| Example 1 | Application twice by brush | 278 g/m² |
| Example 2 | Application three times by brush | 539 g/m² |
| Example 3 | Application three times by brush | 520 g/m² |
| Fluorosilane system, neat | Application three times by HVLP spraying | 341 g/m² |

The amount of fluorosilane system used was therefore only 236.3 g/m², when the product from Example 1 was applied, 26.95 g/m² and 26 g/m² when the products from Examples 2 and 3 were applied, respectively, while in the case of neat fluorosilane system the consumption was 341 g/m².

| | | Stress test | |
|---|---|---|---|
| Product | Functional test Ci value | Ci value 1st cleaning | Ci value 2nd cleaning |
| Example 1 | 100 | 100 | 99 |
| Example 2 | 100 | 98 | 95 |
| Example 3 | 100 | 97 | 94 |
| Fluorosilane system, neat | 100 | 100 | 100 |

The cleaning outcome was very good in all cases. Ci values>90 in practice characterize a very good cleaning outcome. Cleaning took place in accordance with the method described above.

Despite a substantially lower consumption of fluorinated silane component and despite application with only a low level of technical complexity (by brush), the products of Examples 1,2, and 3 give outstanding cleaning outcomes even in the case of repeated graffiti cleaning, without it being necessary to reapply the protectant system.

Example 5

Impregnation of Maintal sandstone with product from Examples 1 and 2 and also with an antigraffiti system from PSS Interservice, consisting of the components PSS 20 (protectant system) and Faceal Oleo (primer). Implementation of the accelerated weathering test.

The product from Example 1 was applied once by brush to Maintal sandstone. The amount of product consumed was approximately 250 g/m².

The product from Example 2 was applied in two applications to Maintal sandstone. The total product consumption was approximately 350 g/m². The drying time between applications was ½ an hour.

For comparison a commercial temporary antigraffiti system, consisting of the components Faceal Oleo (primer) and PSS20 (protectant coat), was applied to a Main sandstone by HVLP spraying. The drying time between spray applications was 30 minutes. The amount of Faceal Oleo consumed was approximately 130 g/m², the amount of PSS20 approximately 270 g/m².

After a reaction time of 1 week, the treated blocks were subjected to QUV accelerated weathering. The quality of the coating was tested as described above. The result is shown in the table below. + means that the performance test was passed; − means that the above-described performance test was failed and that it is assumed that the antigraffiti performance is inadequate.

| Product | 0 h QUV exposure | 250 h QUV exposure |
|---|---|---|
| Example 1 | + | + |
| Example 2 | + | + |
| Example 3 | + | + |
| Faceal Oleo/PSS20 | + | − |

The comparison system therefore showed inadequate performance after 250 hours of QUV weathering, whereas the products of the invention still showed optimum surface quality.

What is claimed is:

1. A composition which comprises
(a) 0.5 to 15% by weight, relative to the total solids content of said composition, of an organofunctional silane, in which fluorinated alkyl groups of formula $F_3C(CF_2)_r(CH_2)_s$— are attached at least to some of the Si atoms, r being an integer between 1 and 18 and s being 0 or 2, and the organofunctional silane is:
(a2) fluoroalkyl-functional of formula (I)

$$RO[Si(A)(CH_3)_z(OR)_{1-z}O]_a[Si(B)(R^2)_y(OR)_{1-y}O]_b[Si(C)(CH_3)O]_c[Si(D)(OR)O]_d \cdot (HX)_e \qquad (I)$$

in which A is an aminoalkyl radical derived from formula (II)

$$H_2N(CH_2)_f(NH)_g(CH_2)_hSi(OR)_{3-z}(CH_3)_z \qquad (II)$$

where $0 \leq f \leq 6$, $g=0$ if $f=0$ and $g=1$ if $f>0$, $0 \leq h \leq 6$, and $0 \leq z \leq 1$,
and B is a fluoroalkyl radical derived from formula (III)

$$R^1—Y_m—(CH_2)_2Si(R_2)_y(OR)_{3-y} \qquad (III)$$

$R^1$ being a mono-, oligo- or perfluorinated alkyl group having 1 to 9 carbon atoms or a mono-, oligo- or perfluorinated aryl group, Y being a $CH_2$—, O— or S group, $R^2$ being a linear, branched or cyclic alkyl group having 1 to 8 carbon atoms or an aryl group, m being 0 or 1 and $0 \leq y \leq 1$, and C is an alkyl radical derived from the general formula (IV)

$$R^3—Si(CH_3)(OR)_2 \qquad (IV)$$

and D is likewise an alkyl radical, but derived from formula (V)

$$R^3—Si(OR)_3 \qquad (V)$$

$R^3$ in the above formulae being a linear, branched or cyclic alkyl group having 1 to 8 carbon atoms, $R^3$ in the above formulae being identical or different at each occurrence, R in the above formulae being a linear, branched or cyclic alkyl group having 1 to 8 carbon atoms or an aryl group, and R in the above formulae being identical or different at each occurrence, and HX being an acid, X being an organic or inorganic acid radical, and $0 \leq y \leq 1$, $0 \leq z \leq 1$, $a>0$, $b>0$, $c \geq 0$, $d \geq 0$, $e \geq 0$ and $(a+b+c+d) \geq 2$,
or a mixture of said (a2) and at least one of:
(a1) an organosiloxane comprising
at least one triamino group of formula (Ia)

$$[NH_x(CH_2)_aNH_y(CH_2)_bNH^z]— \qquad (Ia),$$

attached to at least one silicon atom via at least one further N-attached alkylene group having 1 to 4 carbon atoms, a and b being identical or different and being an integer from 1 to 6, x being 0 or 1 or 2, y being 0 or 1, z being 0 or 1 or 2, with the proviso that $(x+y+z) \leq 4$, and at least one Si—C-attached fluoroalkyl group of formula (Ib)

$F_3C(CF_2)_r(CH_2)_s—$ (Ib), in which r is an integer from 0 to 18 and s is 0 or 2, and
(a3) an oligomerized organopolysiloxane cocondensate obtained by mixing an organosilane having the formula (II), in which f is 0 or an integer from 1 to 6, g is 0 if f is 0 and g is 1 if f is other than 0, h is an integer from 1 to 6, z is 0, 1 or 2, and the remaining radicals are as defined above, with at least one of a fluorofunctional organosilane having the formula (III), in which y is 0 or 1, with at least one organosilane of the formula (IV), and one organosilane of the formula (V), in a molar ratio M=[a/(b+c+d)]≧0.1, a being the sum of the numbers of moles of organosilanes of formula (II), b, optionally, being the sum of the numbers of moles of organosilanes of formula (III), c, optionally, being the sum of the numbers of moles of organosilanes of formula (IV), and d, optionally, being the sum of the numbers of moles of organosilanes of the formula (V); adding water or an acid, and, optionally, an alcohol, to the mixture; and carrying out oligomerization (b) >1.5 to 10% by weight, relative to the total solids content of said composition, of a cellulosic thickener, and (c) water or another diluent, present in an amount that makes up the overall formulation of said composition to 100%.

2. The composition as claimed in claim 1, further comprising preservatives, flow control assistants, and additional, non-Si-containing fluorine components.

3. The composition as claimed in claim 1, wherein said cellulosic thickener is a hydroxyethylcellulose, where an aqueous solution thereof having said hydroxyethylcellulose present in an amount of 1% to 5% by weight of said solution, has a viscosity of from 75 to 50 000 mPa·s at 25° C.

4. The composition as claimed in claim 1, wherein said cellulosic thickener is at least one of a hydroxyethylcellulose which at a 5% strength solution has a viscosity ranging from 113 to 150 mPa·s and a hydroxyethylcellulose which at a 1% strength solution has a viscosity of 4400 to 6000 mPa·s at 25° C.

5. The composition as claimed in claim 1, wherein component (c) is water or an alcohol.

6. The composition as claimed in claim 2, wherein said preservatives are at least one of isothiazolinones, methylisothiazolinone, chloromethylisothiazolinone, octylisothiazolinone, tetramethylolacetylenediurea, ethylene glycol hemiformal, dimethylolurea, bromonitropropanediol, carbendazim, terbutryn, zinc pyridinethione, sodium pyridinethione and dodecyldimethylammonium chloride.

7. The composition as claimed in claim 2, wherein said flow control assistant is an additive that lowers surface tension.

8. The composition as claimed in claim 7, wherein said flow control assistant is a polar solvent.

9. The composition as claimed in claim 2, wherein said non-Si-containing fluorine components are at least one of fluoroacrylic methacrylates, fluoroalkyl esters, fluoroalkyl phosphates, fluorinated isocyanates, fluoroalkyl carboxylates and/or fluoroalkyl sulfates and organic polymers which have been provided with the abovementioned functionalities and which optionally contain quaternary ammonium groups.

10. The composition as claimed in claim 2, wherein
the additional, non-Si-containing fluorine components are present in a concentration of from 0 to 30%,
the preservatives are present in a concentration of from 0 to 1%,
the flow control assistants are present in a concentration of from 0 to 10%, and
component (c) makes up the overall formulation to 100%.

11. A process for preparing a composition as claimed claim 1, which comprises first dissolving the thickener (b) in solvent/diluent (c) in the temperature range from 10 to 80° C. and then adding the remaining components while stirring.

12. A process for producing protected substrates, which comprises applying a composition as claimed in claim 1 to the substrate by brush, roller or spraying apparatus.

13. The process as claimed in claim 12, wherein application takes place in two or more coats until the desired product application is achieved.

14. The process as claimed in claim 12, wherein the composition is applied with a product consumption of from 20 to 1000 g/m².

15. A method for protecting a porous material against soiling from paint, ink, or both, wherein said method comprises applying to the porous material the composition according to claim 1.

16. A coated substrate produced by a process as claimed in claim 12.

17. The composition as claimed in claim 1, wherein said organofunctional silane is present in an amount of from 0.5% to less than 5% by weight, relative to 100% by weight of said composition.

18. The composition as claimed in claim 1, wherein said cellulosic thickener is present in an amount of 3.03 to 10% by weight, relative to the total solids content of said composition.

* * * * *